(12) United States Patent
Newberry

(10) Patent No.: US 9,611,929 B2
(45) Date of Patent: Apr. 4, 2017

(54) GEARBOX LUBRICATION

(71) Applicant: AgustaWestland Limited, Yeovil, Somerset (GB)

(72) Inventor: Paul Terrence Newberry, Somerset (GB)

(73) Assignee: AgustaWestland Limited, Yeovil (GB)

( * ) Notice: Subject to any disclaimer, the term of this patent is extended or adjusted under 35 U.S.C. 154(b) by 217 days.

(21) Appl. No.: 13/969,310

(22) Filed: Aug. 16, 2013

(65) Prior Publication Data

US 2013/0333506 A1 Dec. 19, 2013

Related U.S. Application Data

(63) Continuation of application No. PCT/GB2012/050350, filed on Feb. 16, 2012.

(30) Foreign Application Priority Data

Feb. 17, 2011 (GB) .................................. 1102763.8

(51) Int. Cl.
  *F16H 57/04* (2010.01)
  *B64C 27/14* (2006.01)
  *F16H 57/031* (2012.01)

(52) U.S. Cl.
  CPC ......... *F16H 57/0421* (2013.01); *B64C 27/14* (2013.01); *F16H 57/031* (2013.01); *F16H 57/043* (2013.01); *F16H 57/0426* (2013.01); *F16H 57/0471* (2013.01); *F16H 57/0495* (2013.01); *Y10T 74/19991* (2015.01)

(58) Field of Classification Search
  USPC ............................... 74/606 R; 184/6.12, 13.1
  See application file for complete search history.

(56) References Cited

U.S. PATENT DOCUMENTS

| 2,454,040 A | 11/1948 | William |
| 2,581,923 A | 1/1952 | Campbell |
| 3,138,136 A | 6/1964 | Nichols |
| 3,450,208 A | 6/1969 | Barton |
| 3,645,644 A * | 2/1972 | Schwisow ................ 416/157 R |
| 3,720,387 A | 3/1973 | Foote |

(Continued)

FOREIGN PATENT DOCUMENTS

| EP | 1 739 012 A1 | 1/2007 |
| GB | 1 340 593 A | 12/1973 |

(Continued)

OTHER PUBLICATIONS

International Search Report, International Application No. PCT/GB2012/050350, Jun. 3, 2013, 5 pages.

(Continued)

*Primary Examiner* — Vicky Johnson
(74) *Attorney, Agent, or Firm* — Lathrop & Gage LLP

(57) ABSTRACT

A gearbox including a housing; an input member rotatably supported in the housing; a rotatable shaft supported in the housing; gearing providing a power transmitting connection between the input member and the rotatable shaft; and an oil feed member held against rotation relative to the housing; wherein the oil feed member has at least one helical formation for causing oil within the gearbox to be fed axially of the oil feed member, on rotation of the rotatable shaft.

13 Claims, 3 Drawing Sheets

(56) References Cited

U.S. PATENT DOCUMENTS

Figure 3:
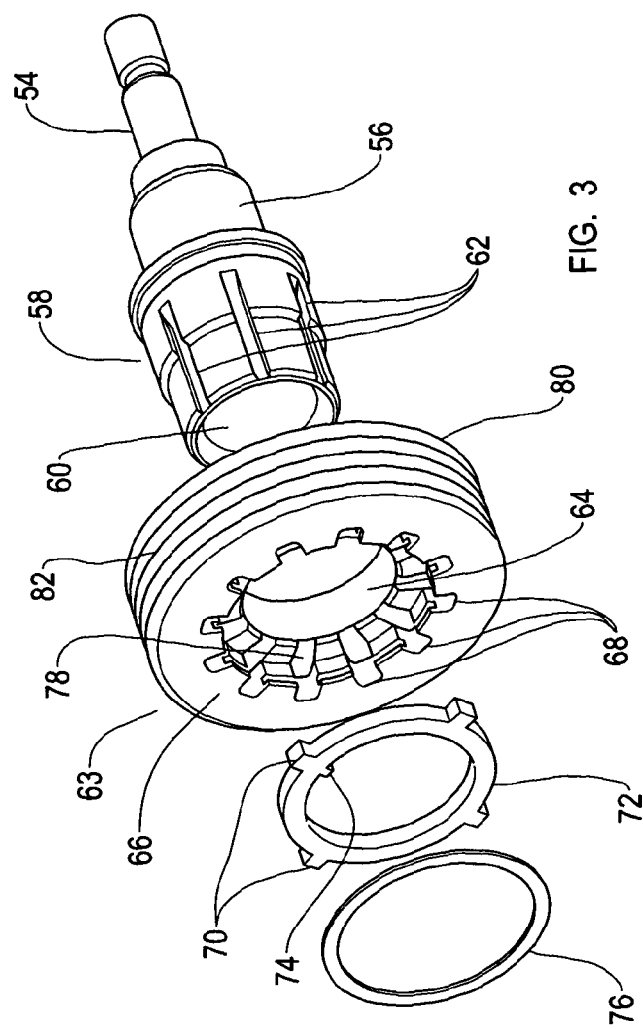

| | | | |
|---|---|---|---|
| 4,231,266 A | | 11/1980 | Nishikawa et al. |
| 4,531,692 A | | 7/1985 | Mateus |
| 4,987,974 A | | 1/1991 | Crouch |
| 5,018,407 A | | 5/1991 | Hoecht |
| 5,411,116 A | | 5/1995 | Kish et al. |
| 5,542,316 A | * | 8/1996 | Spooner et al. .............. 74/650 |
| 6,065,933 A | * | 5/2000 | Secord .................. B63H 1/22 |
| | | | 416/142 |
| 7,124,857 B2 | * | 10/2006 | Gekht et al. ............... 184/11.2 |
| 7,452,300 B2 | * | 11/2008 | Kohno et al. ............... 475/160 |
| 8,747,275 B2 | * | 6/2014 | Shioiri et al. ............... 475/220 |
| 8,845,475 B2 | * | 9/2014 | Mayr et al. ................. 475/220 |
| 2002/0036119 A1 | | 3/2002 | Blanc et al. |
| 2009/0071753 A1 | | 3/2009 | Carnelli et al. |
| 2009/0133961 A1 | | 5/2009 | Corattiyil et al. |
| 2014/0076662 A1 | * | 3/2014 | Newberry ................. 184/6.12 |

FOREIGN PATENT DOCUMENTS

| | | |
|---|---|---|
| JP | S54055261 A | 5/1979 |
| JP | S60116459 A | 6/1985 |
| JP | S60166595 A | 8/1985 |
| JP | 2004169794 A | 6/2004 |
| JP | 2004 360726 A | 12/2004 |
| JP | 2006097714 A | 4/2006 |
| JP | 2007008461 A | 1/2007 |
| JP | 2008144803 A | 6/2008 |
| JP | 2010091000 A | 4/2010 |
| WO | WO 03/020583 A2 | 3/2003 |

OTHER PUBLICATIONS

Office Action corresponding to U.S. Appl. No. 14/000,144, mailed Feb. 4, 2016.

\* cited by examiner

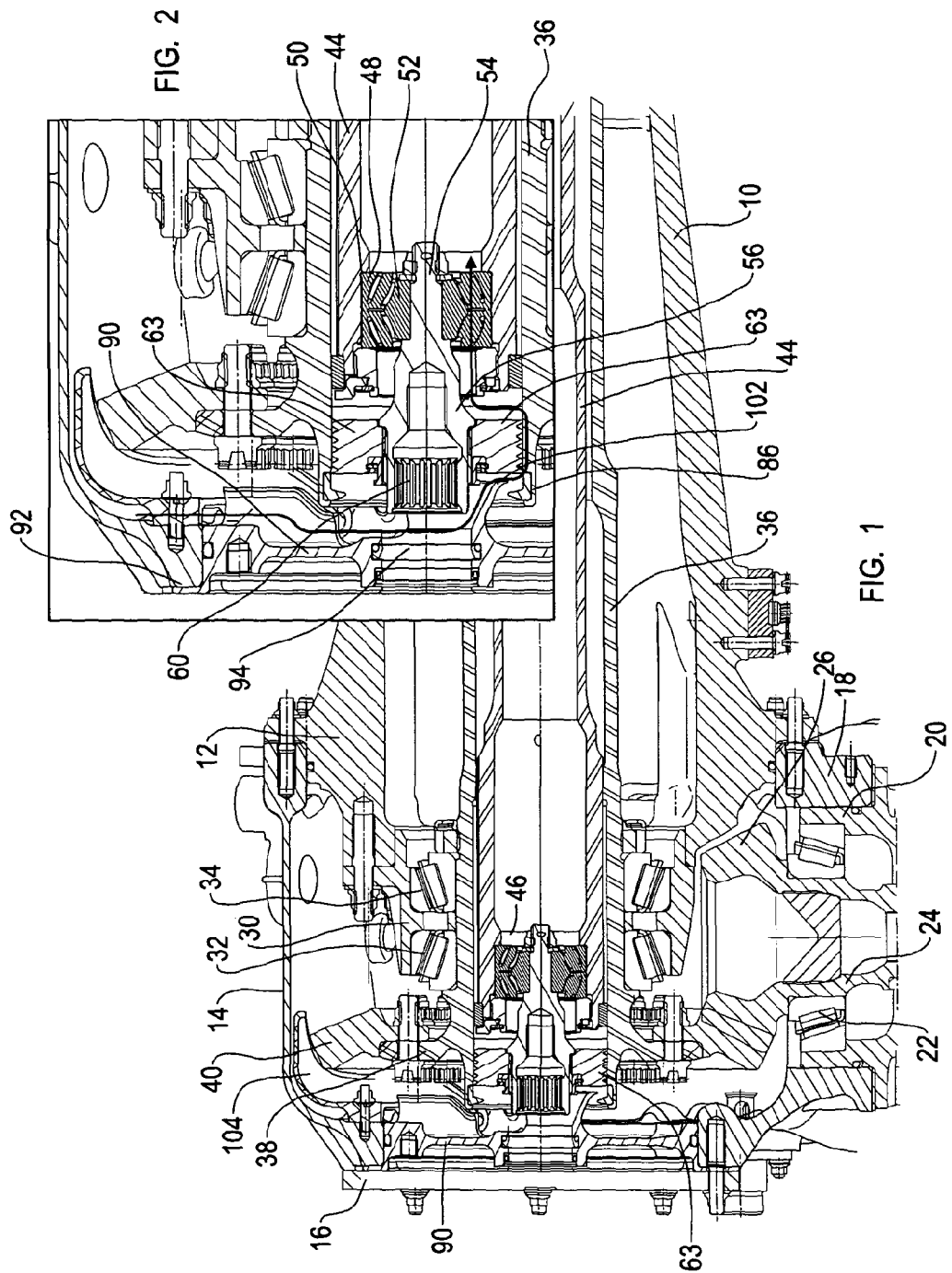

GEARBOX LUBRICATION

CROSS-REFERENCE TO RELATED APPLICATIONS

This application is a continuation of International Application No. PCT/GB2012/050350, filed Feb. 16, 2012, which claims the benefit of British Application No. 1102763.8, filed Feb. 17, 2011. All of these applications are hereby incorporated by reference in their entireties.

This invention relates to a gearbox for a vehicle, and in particular, but not exclusively, to a tail rotor gearbox for a helicopter.

The invention has innovative concepts that can be utilised in other technological fields, for example, automotive gearboxes, in a manner that will be appreciated.

In application to a tail rotor gearbox, more particularly, the invention relates to the lubrication of such a gearbox and specifically to the lubrication of a bearing assembly in such a gearbox by which a pitch control shaft is moved axially within a hollow output shaft of the gearbox through the action of an actuating member. The output shaft carries the tail rotor of the helicopter, and the pitch control shaft is connected to the tail rotor in such a way as to vary, collectively, the pitch of its blades as the pitch control shaft is moved axially relative to the output shaft. Although movable axially therein, the pitch control shaft rotates with the output shaft, and the actuating member, which does not rotate but which is movable in the direction in which the pitch control shaft moves within the output shaft, has to be connected to the pitch control shaft by way of a thrust bearing assembly which is able to transmit axial forces in both directions between the rotating pitch control shaft and the (non-rotating) actuating member.

In a conventional helicopter, the tail rotor gearbox transmits power between a drive shaft assembly which extends longitudinally of the helicopter, from the engine(s) and transmission in the vicinity of the main rotor of the helicopter, to the tail rotor. The output shaft of the gearbox, on which the tail rotor is mounted, extends transversely of the helicopter. The gearbox includes gearing, e.g. a crown wheel and pinion arrangement which provides for power transmission between the output shaft and an input member whose axis of rotation is at least substantially at right angles to the axis of rotation of the output shaft, the input member of the gearbox being connected to the longitudinal drive shaft assembly of the helicopter. The gearbox provides a reduction gearing transmission ratio between the driveshaft and output shaft.

In a tail rotor gearbox utilised by the present applicant in some of its helicopters, the thrust bearing assembly, by which movement of the actuating member in the direction axially of the output shaft is transmitted to the pitch control shaft, is disposed within an end part of the pitch control shaft within the output shaft. One potential problem associated with such disposition of the bearing assembly is that of lubrication thereof, since any oil in the vicinity of the axis of rotation of the output shaft is centrifuged outwardly from such axis as the output shaft rotates. Without adequate lubrication, the service life of the bearing assembly may be curtailed.

The present invention addresses the problem of lubrication of such a bearing assembly.

According to a first aspect of the present invention, we provide a helicopter tail rotor gearbox including:
a housing;
an output shaft for connection to a tail rotor rotatably supported in the housing and having an open end therein;
an input member rotatably supported in the housing;
gearing providing a power transmitting connection between the input member and output shaft;
a pitch control shaft for effecting a change in the pitch of the tail rotor, the pitch control shaft being disposed at least partially within the output shaft, rotatable therewith, and movable relative thereto along the rotational axis of the output shaft;
an actuating member for effecting axial movement of the pitch control shaft, the actuating member being movable axially of the output shaft but held against rotation therewith; and
a bearing assembly positioned in between the pitch control shaft and the actuating member for permitting relative rotation therebetween;
wherein the gearbox includes at least one formation for diverting oil, dispersed within the housing in use, towards the open end of the output shaft.

According to a second aspect of the invention, we provide a helicopter including a gearbox according to the first aspect of the invention.

According to a third aspect of the invention, we provide a helicopter tail rotor system including a gearbox according to the first aspect of the invention.

The gearbox may have an oil feed member held for co-operation with the output shaft at or adjacent the open end thereof and/or with the pitch control shaft, and adapted on relative rotation between the oil feed member and output shaft to cause oil to be fed axially to the vicinity of the bearing assembly.

The oil feed member may have at least one helical formation for causing oil to be fed axially on relative rotation between the oil feed member and a surface co-operating therewith.

The oil feed member may have an external peripheral surface which lies in close proximity to an internal surface of the output shaft, the peripheral surface of the oil feed member being provided with the helical formation(s) to cause oil to be fed axially of the output shaft on relative rotation between the output shaft and oil feed member.

The oil feed member may be held against rotation by being supported on the actuating member.

The at least one formation for diverting oil to the open end of the output shaft may include a deflecting member for deflecting oil from an upper part of the housing interior towards a region adjacent to the open end of the output shaft.

The output shaft may have a formation for retaining oil within the interior of the output shaft and preferably the oil feed member fluidly communicates with the oil retaining formation.

The gearbox may include an oil catcher member with a drainage channel formation for catching oil from the at least one formation for diverting oil. The drainage channel formation may extend radially from a peripheral surface of the oil catcher member towards the rotational axis of the output shaft. Preferably the oil catcher member further includes a further formation in fluid communication with the drainage channel formation for directing caught oil towards the open end of the output shaft. The further directing formation may communicate with the formation for retaining oil within the interior of the shaft and preferably includes a frusto-conical formation.

According to a fourth aspect of the invention, we provide a gearbox including:

a housing;
an input member rotatably supported in the housing;
a rotatable shaft supported in the housing;
gearing providing a power transmitting connection between the input member and the rotatable shaft; and
an oil feed member held against rotation relative to the housing;
wherein the oil feed member has at least one helical formation for causing oil within the gearbox to be fed axially of the oil feed member, on rotation of the rotatable shaft.

According to a fifth aspect of the invention, we provide a vehicle including a gearbox according to the fourth aspect of the invention.

The rotatable shaft may have an open end therein and the oil feed member is positioned in an interior portion of the rotatable shaft.

In use, the oil feed member may cause oil dispersed within the housing to be fed into the interior of the rotatable shaft or cause oil within the rotatable shaft to be fed into an interior of the housing.

The gearbox may include at least one formation for diverting oil towards the oil feed member. The at least one formation for diverting oil may include a deflecting member for deflecting oil from a remote part of the housing towards the oil feed member.

The oil feed member may have an external peripheral surface on which the at least one helical formation is formed, the external peripheral surface lying in close proximity to an internal surface of the rotating shaft.

The oil feed member may be supported on a member which is held against rotation relative to the rotatable shaft.

The rotatable shaft may have a formation for retaining oil within the interior of the rotatable shaft and preferably the oil feed member fluidly communicates with the oil retaining formation.

The gearbox may further include an oil catcher member with a drainage channel formation for catching oil from an interior of the housing. The oil catcher drainage channel formation may catch oil from the at least one formation for diverting oil. The drainage formation preferably extends radially from a peripheral surface of the oil catcher member towards the rotational axis of the rotatable shaft. The oil catcher member may include a further formation in fluid communication with the drainage channel formation for directing caught oil towards the interior portion of the rotatable shaft. The further directing formation may communicate with the formation for retaining oil within the interior of the shaft and preferably comprises a frusto-conical formation.

Figure 4:
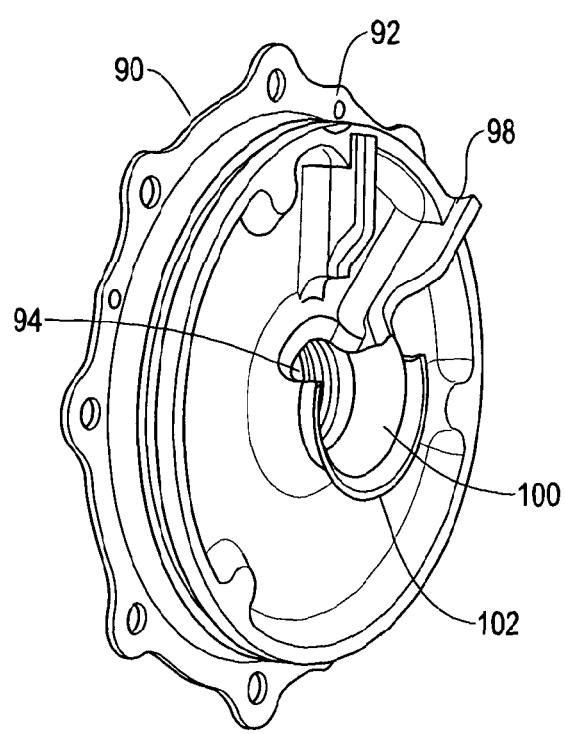

These and other features of the invention will now be described by way of example with reference to the accompanying drawings of which:

FIG. 1 is a sectional illustration of a tail rotor gearbox to which the invention has been applied, FIG. 2 is an enlargement of part of FIG. 1, FIG. 3 is an exploded perspective view of parts of the gearbox, FIG. 4 is a perspective view of a further part of the gearbox.

Referring to the drawings, the illustrated gearbox is a tail rotor gearbox that comprises a housing indicated generally at 10. The housing comprises a number of housing parts secured together by screw-threaded fastenings at joint faces therebetween, the housing including an elongate, tapering, first part 12, a second part 14, an end cover part 16 and a side part 18. The side part 18 carries a bearing-supporting structure 20, which supports, by way of two oppositely-oriented taper roller bearing assemblies only one of which is indicated at 22, an input member 24 having a pinion gear 26 inside the housing of the gearbox. Outside the housing, the input member 24 carries a drive flange (not shown) or other element for connection to a tail rotor drive shaft assembly.

In the interior of the housing 10, the housing part 12 carries a bearing-support member 30 containing oppositely-oriented taper roller bearings whose outer races are supported in the member 30. The inner races of the bearings 32, 34 are received on the exterior surface of a hollow gearbox output shaft 36 which is provided, adjacent its free end within the gearbox housing 10, with a flange part 38 to which is fastened a crown wheel gear 40, having teeth which mesh with the teeth of the pinion gear 26 so as to provide a reduction gear ratio between the input member 24 and output shaft 36 of the gearbox. The output shaft 36 rotates by the gearing connecting the input member 24 to the output shaft 36. The other end of the output shaft 36 extends through the casing part 12 and is supported by another bearing or bearings not shown, the shaft emerging from the gearbox housing 10 and being adapted for carrying a tail rotor assembly, also not shown.

Within the output shaft 36 there is disposed a pitch control shaft 44. This is movable relative to the output shaft 36 in the direction of the rotational axis of the output shaft 36, but it rotates with the output shaft 36, having a splined connection with the interior thereof.

Adjacent the end of pitch control shaft 44 within the gearbox housing 10, a thrust bearing assembly indicated generally at 46 in FIG. 1, and visible in greater detail in FIG. 2 of the drawings, is provided. The thrust bearing assembly 46 is a double row bearing assembly with barrel shaped rollers arranged in two oppositely inclined rows. The outer race 48 of the thrust bearing assembly 46 is held in a seating 50 of the shaft 44, while the inner race 52 of the thrust bearing assembly 46 receives, and is held on, a shaft portion 54 extending axially from an actuating member 56 (FIG. 3). The remainder of the actuating member 56 comprises a body 58 with a splined bore 60 extending into the body from its free end. The external surface of the body 58, outside the splined bore 60 (the splines in the bore 60 not being shown in FIG. 3) is provided with a number of circumferentially spaced axially-extending grooves 62. The actuating member 56 is held against rotation relative to the housing 10.

An oil feed member 63 is carried by the body 58 of the actuating member 56. This is an annular component, having a cylindrical central bore 64 which fits on the external cylindrical surface of the body 58. The visible end face 66 of the oil feed member 63 is provided with a number of circumferentially spaced axially and radially extending recesses 68, some of which are engaged by radially outwardly extending tabs 70 on a locking washer 72, the locking washer also having one or more inwardly extending tabs 74 engageable in a respective one or more of the grooves 62 on the actuating member 56. Hence the oil feed member 63 is held against rotation relative to the actuating member 56 and the housing 10. The oil feed member 63 is stationary during operation of the gearbox. A retaining ring, e.g. a "Spirolox"™ retaining ring, 76, is engaged in an annular undercut groove 78 adjacent the end face 66 of the oil feed member 63, retaining the locking washer 72 in the interior of the oil feed member 63.

The external surface 80 on a peripheral portion of the oil feed member 63 lies in close proximity to the interior cylindrical surface of the output shaft 36 surrounding it. The surface 80 of the oil feed member 63 is provided with at least one helical groove 82 of such width, depth, and hand as to cause oil in the vicinity thereof, when the output shaft 36 is rotating in use but the oil feed member 63 not rotating, to be fed axially to the right hand side of the oil feed member 62, having regard to the orientation in which it is shown in the drawings. In other words, such feed of oil is towards the thrust bearing assembly 46.

If more than one helical groove 82 is provided in the surface 80, the grooves may be arranged in the manner of a multi-start screw thread.

Adjacent the free end of the output shaft 36, beyond the oil feed member 63, an undercut annular recess within the output shaft 36 accommodates a member 86 having an annular radially inwardly extending wall formation. The effect of the member 86 is to retain a small quantity of oil in the interior of the output shaft 36, as a pool at its lowermost part when the output shaft 36 is not rotating, or as a film around its inner surface under centrifugal action when the output shaft 36 is rotating. Such oil contacts the oil feed member 63, to be fed towards the thrust bearing assembly 46 by the action of the helical formation on the peripheral surface of the oil feed member 63.

To aid retention of oil in the interior of the output shaft 36, so that the oil can be moved towards the thrust bearing assembly 46 as aforesaid, an oil catcher member 90, shown in FIG. 4 of the drawings, is held within the housing of the gearbox, inside the end cover part 16 and facing the open end of the output shaft 36.

An external flange 92 of the oil catcher member 90 is held between joint faces of the respective housing parts 14, 16. The oil catcher member 90 has a central aperture 94 through which the output member (not shown) of an actuator assembly (not shown), but disposed outside the housing part 16, extends, such an output member having a splined end portion which engages the splined bore 60 of the actuating member 56. This prevents the actuating member 56 and components carried thereby from rotating. The output member of the actuator assembly causes displacement of the pitch control shaft 44, moved through the intermediary of the actuating member 56 and thrust bearing assembly 46, axially relative to the gearbox output shaft 36, thereby effecting collective control of the pitch of the tail rotor blades.

The oil catcher member 90 has an oil-catching drainage channel formation 98 extending at an inclination downwardly, from its peripheral region facing the crown wheel 40, towards the central aperture 94. The channel 98 leads into a somewhat frusto-conical directing formation 100, discharging oil from an end portion 102 of the formation 100, which end portion lies within the end of the output shaft 36 beyond the member 86. An oil deflecting member 104 is provided within the housing part 14 at a remote part of the housing, adjacent the upper part of the housing and generally above part of the periphery of the crown wheel 40, so as to deflect oil thrown centrifugally around the interior of the housing towards the channel 98 of the oil catcher member 90.

In use, by virtue of the operation of the oil feed member 63 and the supply of oil thereto by the oil deflector member 104 and the oil catcher member 90, is to ensure that the thrust bearing assembly 46 is effectively lubricated. However, it will be appreciated that the oil deflector member 104 can be used independently of the oil catcher member 90 and the oil feed member 63 to deliver oil to the interior of the output shaft 36 and thereby lubricate the thrust bearing assembly 46. Furthermore, the oil catch member 90 can be used in conjunction with the oil deflector member 104 to aid in lubrication of the thrust bearing assembly 46. The oil deflector member 104 may be in co-operation with other features well known in the art for channelling oil so as to deflect oil from a remote part of the housing to an intended region.

It will be appreciated that the concept of using a stationary oil feed member together with other rotatable surfaces has application in many technological fields, e.g. aviation gearboxes, automotive gearboxes. In an alternative mode of operation, the oil feed member may also be utilised to cause oil within the rotatable shaft/output shaft to be fed into an interior of the housing. In other words, the oil feed member can be configured to cause oil to flow in either direction by altering the direction of the rotatable shaft or the configuration of the helical channel on the surface of the oil feed member.

The oil feed member 63 may conveniently be a moulding of a suitable plastics material, e.g. PEEK (polyether ether ketone).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Further features of one or more aspects of the invention are set out in the numbered clauses provided below.

Clauses

1. A helicopter tail rotor gearbox including:
   a housing;
   an output shaft for connection to a tail rotor rotatably supported in the housing and having an open end therein;
   an input member rotatably supported in the housing; gearing providing a power transmitting connection between the input member and output shaft;
   a pitch control shaft for effecting a change in the pitch of the tail rotor, the pitch control shaft being disposed at least partially within the output shaft, rotatable therewith, and movable relative thereto along the rotational axis of the output shaft;
   an actuating member for effecting axial movement of the pitch control shaft, the actuating member being movable axially of the output shaft but held against rotation therewith; and
   a bearing assembly positioned in between the pitch control shaft and the actuating member for permitting relative rotation therebetween;
   wherein the gearbox includes at least one formation for diverting oil, dispersed within the housing in use, towards the open end of the output shaft.

2. A gearbox according to clause 1 further including an oil feed member held for co-operation with the output shaft at or adjacent the open end thereof and/or with the pitch control shaft, and adapted on relative rotation between the oil feed member and output shaft to cause oil to be fed axially to the vicinity of the bearing assembly.

3. A gearbox according to clause 2 wherein the oil feed member has at least one helical formation for causing oil to be fed axially, on relative rotation between the oil feed member and a surface co-operating therewith.

4. A gearbox according to clause 3 wherein the oil feed member has an external peripheral surface lying in close proximity to an internal surface of the output shaft, the peripheral surface of the oil feed member being provided with the helical formation(s) for causing axial feeding of oil on relative rotation between the output shaft and oil feed member.

5. A gearbox according to any one of the preceding clauses wherein the oil feed member is held against rotation by being supported on the actuating member.

6. A gearbox according to any one of the preceding clauses wherein the at least one formation for diverting oil to the open end of the output shaft includes a deflecting member for deflecting oil from an upper part of the housing interior towards a region adjacent to the open end of the output shaft.

7. A gearbox according to any one of the preceding clauses wherein the output shaft has a formation for retaining oil within an interior of the output shaft.

8. A gearbox according to clause 7, when appendent to clause 2, wherein the oil feed member fluidly communicates with the oil retaining formation.

9. A gearbox according to any preceding clause further comprising an oil catcher member with a drainage channel formation for catching oil from the at least one formation for diverting oil.

10. A gearbox according to clause 9 wherein the drainage formation extends radially from a peripheral surface of the oil catcher member towards the rotational axis of the output shaft.

11. A gearbox according to clause 9 or 10 the oil catcher member including a further formation in fluid communication with the drainage channel formation for directing caught oil towards the open end of the output shaft.

12. A gearbox according to clause 11 when appendent to either clause 7 or 8 wherein the further directing formation communicates with the formation for retaining oil within the interior of the shaft.

13. A gearbox according to clause 11 or 12 wherein the further directing formation includes a frusto-conical formation.

14. A helicopter including a gearbox according to any one of the preceding clauses.

15. A helicopter tail rotor system including a gearbox according to any one of clauses 1 to 13.

16. A gearbox including:
a housing;
an input member rotatably supported in the housing;
a rotatable shaft supported in the housing;
gearing providing a power transmitting connection between the input member and the rotatable shaft; and
an oil feed member held against rotation relative to the housing;
wherein the oil feed member has at least one helical formation for causing oil within the gearbox to be fed axially of the oil feed member, on rotation of the rotatable shaft.

17. A gearbox according to clause 16 wherein the rotatable shaft has an open end therein and the oil feed member is positioned in an interior portion of the rotatable shaft.

18. A gearbox according to clause 16 or 17, wherein, in use, the oil feed member causes oil dispersed within the housing to be fed into the interior of the rotatable shaft.

19. A gearbox according to clause 16 or 17, wherein, in use, the oil feed member causes oil within the rotatable shaft to be fed into an interior of the housing.

20. A gearbox according to any one of clauses 16 to 19 wherein the gearbox includes at least one formation for diverting oil towards the oil feed member.

21. A gearbox according to clause 20, wherein the at least one formation for diverting oil includes a deflecting member for deflecting oil from a remote part of the housing towards the oil feed member.

22. A gearbox according to any one of clauses 16 to 21 wherein the oil feed member has an external peripheral surface on which the at least one helical formation is provided, the external peripheral surface lying in close proximity to an internal surface of the rotating shaft.

23. A gearbox according to any one of clauses 16 to 22 wherein the oil feed member is supported on a member which is held against rotation relative to the rotatable shaft.

24. A gearbox according to any one of clauses 16 to 23 wherein the rotatable shaft has a formation for retaining oil within the interior of the rotatable shaft.

25. A gearbox according to clause 24 wherein the oil feed member fluidly communicates with the oil retaining formation.

26. A gearbox according to any one of clauses 16 to 25, further including an oil catcher member with a drainage channel formation for catching oil from an interior of the housing.

27. A gearbox according to clause 26, when appendent to clause 21, wherein oil catcher drainage channel formation catches oil from the at least one formation for diverting oil.

28. A gearbox according to clause 27 wherein the drainage formation extends radially from a peripheral surface of the oil catcher member towards the rotational axis of the rotatable shaft.

29. A gearbox according to any one of clauses 26 to 28 wherein the oil catcher member includes a further formation in fluid communication with the drainage channel formation for directing caught oil towards the interior portion of the rotatable shaft.

30. A gearbox according to clause 29, when appendent to clause 24 or 25 wherein the further directing formation communicates with the formation for retaining oil within the interior of the shaft.

31. A gearbox according to clause 29 or 30 wherein the further directing formation comprises a frusto-conical formation.

32. A vehicle including a gearbox according to any one of clauses 16 to 31.

33. A gearbox substantially as hereinbefore described with reference to and as shown in the accompanying drawings.

34. Any novel feature or novel combination of features described herein and/or in the accompanying drawings.

The invention claimed is:
1. A gearbox comprising:
a housing;
an input member rotatably supported in the housing;
a rotatable shaft supported in the housing, wherein the rotatable shaft has an open end therein and an oil feed member is positioned in an interior portion of the rotatable shaft;
gearing providing a power transmitting connection between the input member and the rotatable shaft; and
the oil feed member held against rotation relative to the housing;
wherein the oil feed member has at least one helical formation for causing oil within the gearbox to be fed axially of the oil feed member, on rotation of the rotatable shaft, wherein the oil feed member has an external peripheral surface on which the at least one helical formation is provided, the external peripheral surface lying in close proximity to an internal surface of the rotating shaft.

2. The gearbox according to claim 1, wherein the oil feed member is for causing oil dispersed within the housing to be fed into the interior of the rotatable shaft.

3. The gearbox according to claim 1, wherein the oil feed member is for causing oil within the rotatable shaft to be fed into an interior of the housing.

4. The gearbox according to claim 1 wherein the oil feed member is supported on a member which is held against rotation relative to the rotatable shaft.

5. A helicopter tail rotor gearbox comprising:
a housing;
an output shaft for connection to a tail rotor rotatably supported in the housing and having an open end therein;
an input member rotatably supported in the housing;
gearing providing a power transmitting connection between the input member and the output shaft;
a pitch control shaft for effecting a change in the pitch of the tail rotor, the pitch control shaft being disposed at least partially within the output shaft, rotatable therewith, and movable relative thereto along the rotational axis of the output shaft;
an actuating member able to be moved axially within the output shaft, wherein axial movement of the actuating member effects axial movement of the pitch control shaft thereby changing the pitch of the tail rotor, and wherein the actuating member is held against rotation relative to the output shaft;
a bearing assembly positioned in between the pitch control shaft and the actuating member for permitting relative rotation therebetween; and
an oil feed member positioned in an interior portion of the output shaft and held against rotation relative to the housing; wherein the oil feed member has at least one helical formation for causing oil within the gearbox to be fed axially of the oil feed member, on rotation of the output shaft, wherein the oil feed member has an external peripheral surface on which the at least one helical formation is provided, the external peripheral surface lying in close proximity to an internal surface of the output shaft.

6. The gearbox according to claim 5 wherein the gearbox includes at least one formation for diverting oil towards the oil feed member.

7. The gearbox according to claim 6, wherein the at least one formation for diverting oil includes a deflecting member for deflecting oil from a remote part of the housing towards the oil feed member.

8. The gearbox according to claim 7, further including an oil catcher member with a drainage channel formation for catching oil from an interior of the housing.

9. The gearbox according to claim 8, wherein the oil catcher drainage channel formation catches oil from the at least one formation for diverting oil.

10. The gearbox according to claim 9 wherein the drainage channel formation extends radially from a peripheral surface of the oil catcher member towards the rotational axis of the output shaft.

11. The gearbox according to claim 8 wherein the oil catcher member includes a further formation in fluid communication with the drainage channel formation for directing caught oil towards the interior portion of the output shaft.

12. The gearbox according to claim 5 wherein the output shaft has a formation for retaining oil within the interior of the output shaft.

13. The gearbox according to claim 12 wherein the oil feed member fluidly communicates with the oil retaining formation.

* * * * *